Figure 1:
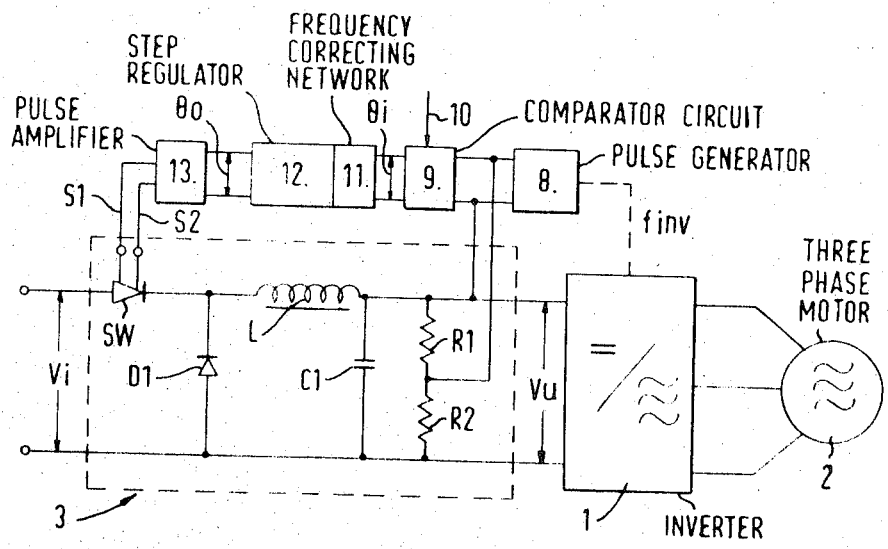

United States Patent [19]
Jensen

[11] 3,761,796
[45] Sept. 25, 1973

[54] INVERTER WITH CONTROLLED RECTIFIERS AND A REGULABLE DIRECT VOLTAGE SUPPLY

[75] Inventor: Arne Jensen, Sonderborg, Denmark
[73] Assignee: Danfoss A/S, Nordborg, Denmark
[22] Filed: May 24, 1972
[21] Appl. No.: 256,564

[30] Foreign Application Priority Data
May 25, 1971 Germany.................. P 21 25 804.8

[52] U.S. Cl............... 321/2, 318/227, 323/17, 323/22 SC, 323/DIG. 1
[51] Int. Cl...................... H02p 13/22, H02m 3/32
[58] Field of Search............... 318/216, 227, 230; 321/2; 323/17, 22 SC, 38, DIG. 1

[56] References Cited
UNITED STATES PATENTS
3,585,491 6/1971 Petersen ................................ 321/2
3,378,758 4/1968 Goodenow.................... 323/DIG. 1
3,437,912 4/1969 Morris .......................... 323/DIG. 1
3,594,623 7/1971 Lamaster.......................... 318/227
3,670,235 6/1972 Bejach........................... 318/230 X Primary Examiner—A. D. Pellinen
Attorney—Wayne B. Easton

[57] ABSTRACT

An inverter arrangement including controlled rectifiers, the inverter being supplied by a regulatable direct voltage supply which includes an on-off switchable element and a filter. A control circuit connected to the output of the supply generates and directs first control pulses to the switchable element, and a pulse generator also connected to the output of the supply generates and directs second control pulses to control the rectifiers in the inverter. The control circuit includes a step regulator having an amplifier, a feedback path and apparatus for producing an oscillation, the step regulator having the effect of altering both the frequency and the width of the first control pulses when the voltage at the output of the supply changes.

8 Claims, 7 Drawing Figures

INVERTER WITH CONTROLLED RECTIFIERS AND A REGULABLE DIRECT VOLTAGE SUPPLY

The invention relates to an inverter with controlled rectifiers which are supplied with control pulses by a frequency generator, and with a regulable direct voltage supply to which a fixed direct voltage is applied and which comprises an on-off switching element actuated by a control circuit and having a filter element connected to its output side, and which provides a voltage substantially proportional to the frequency of the control pulse.

A typical use for an inverter of this kind is that of feeding a three-phase motor, the speed of which is dependent upon the frequency of the control pulse. Proportionality between the frequency of the control pulse and the output voltage of the direct voltage supply is achieved, for example, by controlling the frequency generator by this output voltage and varying the direct voltage for regulating the speed of the motor.

The direct voltage is varied by varying the ratio of the on period of the switching element to its off period. The greater the width of the pulse between the on time and the off time, the higher is the voltage. The beat frequency is usually kept constant and the pulse width varied. The pulse width has also been kept constant and the beat frequency varied. Combined forms are also known wherein, for example, the on time is first kept constant as the voltage rises and the frequency increased, the frequency then kept constant and the on time increased, and finally the off time kept constant and the frequency reduced.

When these known regulable direct voltage supply means are used in conjunction with an inverter of the initially stated kind, it has been found that the inverter operates in an unstable manner at certain points in the working range. When the system is used for powering a motor, this instability has the effect of causing the speed of the motor to fluctuate within certain working ranges.

The object of the invention is to provide an inverter of the initially stated kind in which substantially stable operation is ensured in all the working ranges.

According to the invention, this object is achieved by the control circuit including a time proportional regulator which, as a result of the use of an amplifier having a high gain factor, a negative time-delay feedback and an additional element producing an oscillation, alters both the frequency and the pulse-width of the output signal of the regulator when the input signal changes.

As will be explained in more detail hereinafter, the invention is based upon the consideration that the reason for the instability of the inverter is that the pulses occurring when the switching element is actuated interfere with the control pulses that are to be passed to the controlled rectifiers. As the magnitude of the voltage to be received from the output of the direct voltage supply increases, the output signals provided by a time proportional regulator have a frequency which begins at approximately zero, rises to a maximum value and then drops back to approximately zero. The steepness of the descending branch of this frequency curve ensures that the frequency occurring at the output of the inverter differs at most only slightly from the required frequency.

Furthermore, in the case of a time proportional regulator, the following advantages are achieved without any additional measure. With a very low voltage at the output of the direct voltage supply means, not only the on time but also the frequency of the output signal from the regulator and that from the switching element move towards zero. If however the switching element only allows the passage of pulses of small width at greater intervals, then even if short-circuiting occurs in the inverter, there is no danger of overloading of the switching element. In the case where the voltage at the output of the direct voltage supply means is close to the maximum, not only does the off time but also the frequency of the output signal from the regulator and that from the switching element move towards zero. Because of the low frequency, the switching losses can be kept low and this is important since due to the maximum capacity, maximum losses also occur in the other parts of the inverter.

Particular advantage accrues if the oscillation-producing additional element is constituted by a positive feedback, the effect of which is less than that of the negative feedback. By appropriately selecting the positive and negative feedbacks it becomes possible to carry out regulation in a manner that is well suited to the particular conditions.

A further possibility is that of combining the amplifier and the additional element that produces the oscillation to form an amplifier exhibiting hysteresis.

The amplifier is preferably a sum-and-difference amplifier, the output of which is connected via the negative feedback to one of the inputs and via the positive feedback to the other input. The functional direction (negative-positive) can then be fixed in a simple manner by connecting the feedback to one of the two inputs.

In the simplest case, the negative feedback incorporates a RC element for time-delay purposes.

It is particularly advantageous if the negative feedback incorporates a non-linear element. The non-linear element can be constituted for example, by a diode and a resistor connected in series, this arrangement bridging the resistor in the negative feedback. By means of the non-linear element it is possible to increase the maximum oscillation frequency and thus the output frequency of the time proportional regulator as well as the steepness of the frequency curve in those ranges in which instability might occur, so that the range prone to trouble is still further reduced.

Furthermore, the output of the amplifier can be bridged by a diode which limits the output voltage to values less than zero. In this way, the working range of the amplifier is accurately determined.

Moreover, a RC element of the same order of magnitude as that in the negative feedback can be connected in front of the input of the amplifier. In this way, the derivative action of the regulator is offset.

From the point of view of circuitry technique it is advantageous if the sum-and-difference amplifier incorporates two transistors, having a common emitter resistor, and an output transistor which is controlled by the voltage-drop at the collector resistor of one of the sum-and-difference transistors, and if the sum-and-difference amplifier is connected between two supply leads which carry a higher and lower potential than a neutral lead which connects the first terminal of the amplifier input to the first terminal of the amplifier output, and also if the second output terminal as well as both feedbacks are connected at a point between the output transistor and its collector resistor.

In this arrangement the second output terminal is expediently connected to the first output terminal via a first voltage divider, and to the second input terminal via a second voltage divider, the bases of the two sum-and-difference transistors being connected to the taps of the voltage dividers.

Figure 2:
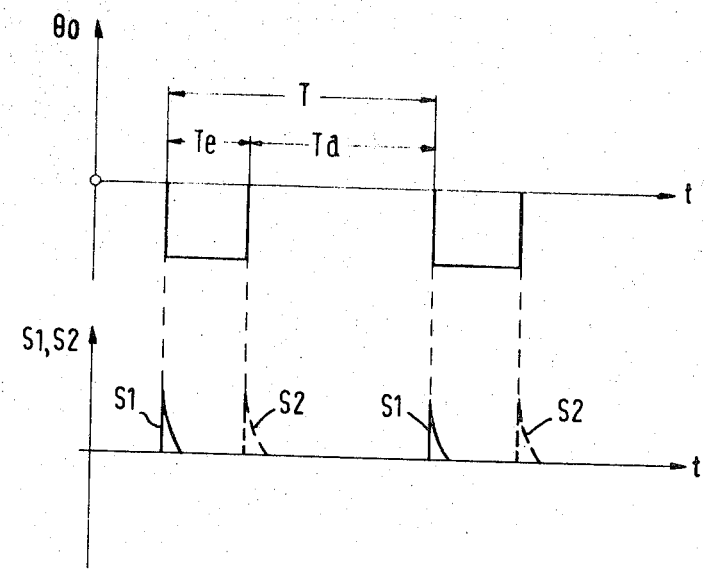
Figure 3:
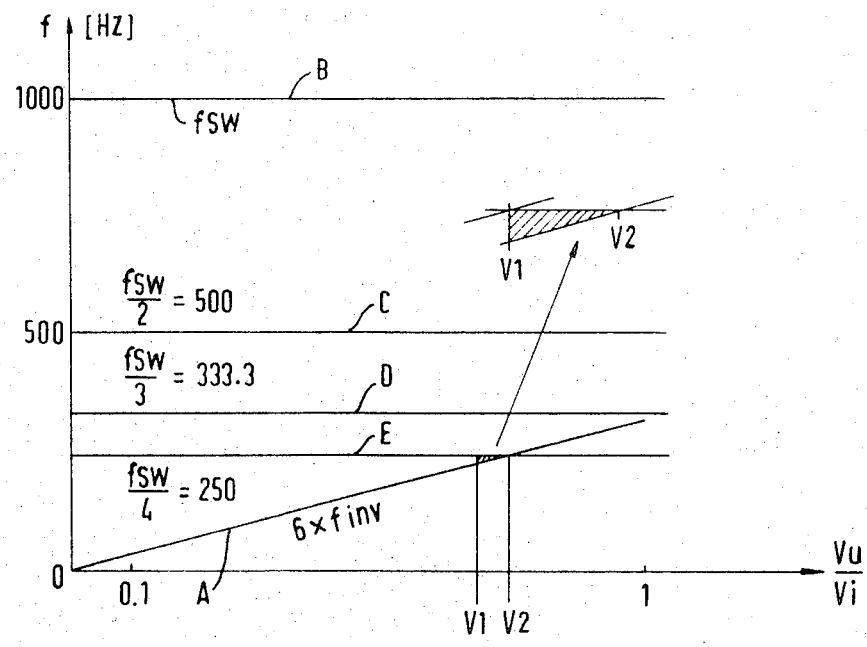
Figure 4:
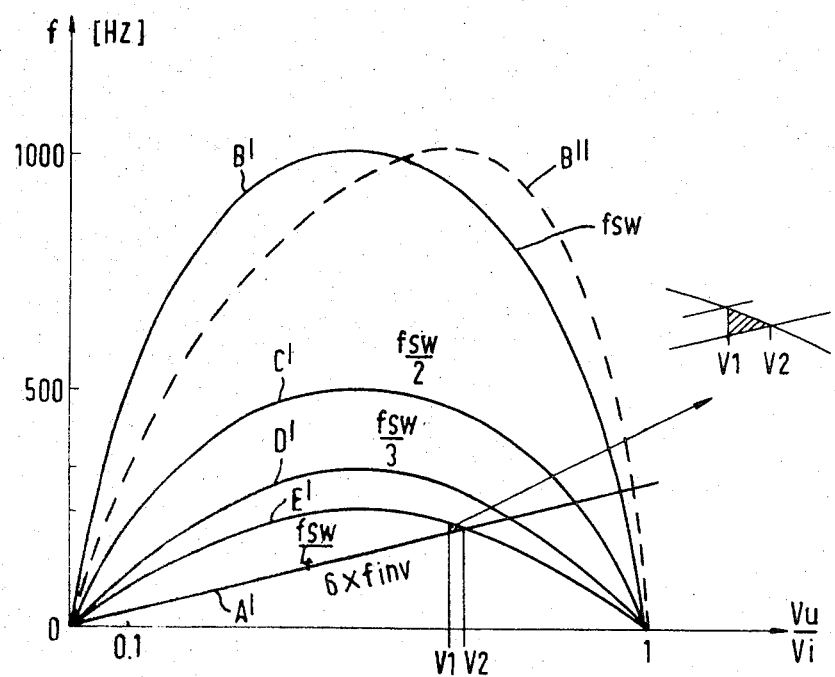
Figure 5:
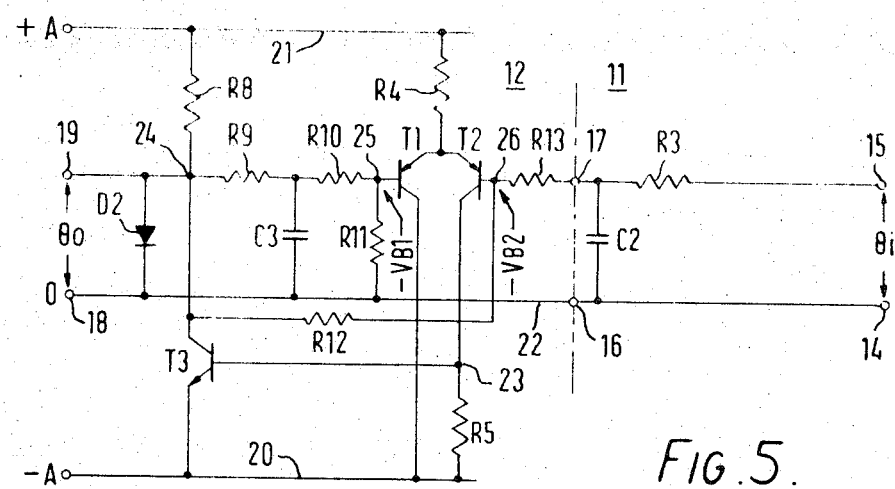
Figure 6:
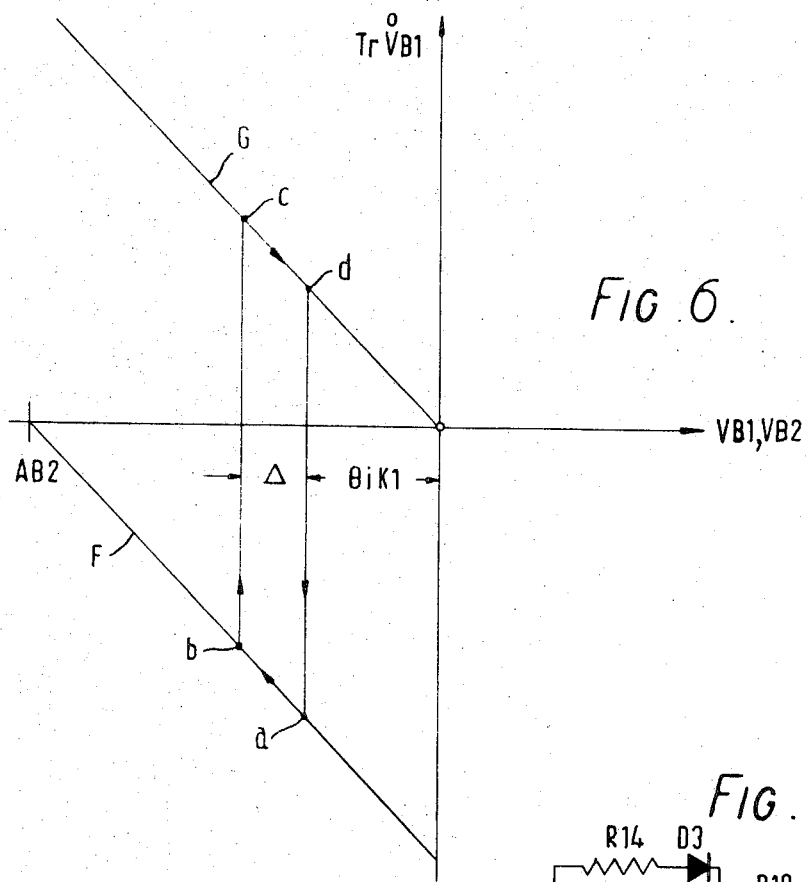
Figure 7:
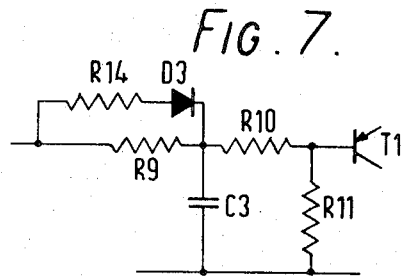

The invention will now be described in greater detail by reference to the drawings, in which:

FIG. 1 is a diagrammatic illustration of an inverter circuit in accordance with the invention, FIG. 2 shows the course of the output voltage $\theta_o$ of the regulator in respect of time, and the pulses for the switching element derived therefrom, FIG. 3 illustrates the frequency for known inverter circuits, FIG. 4 illustrates the frequency for the inverter circuit of the invention, FIG. 5 shows the circuit for one form of regulator in accordance with the invention, FIG. 6 is a phase diagram for determining the operating behaviour of the regulator, and FIG. 7 shows a modified form of the negative feedback in the circuit of FIG. 5.

Referring to FIG. 1, an inverter 1, which powers a three-phase motor 2, is provided with controlled rectifiers. The inverter 1 is fed from a controlled direct voltage supply means 3 with a variable direct voltage $V_u$. The direct voltage supply means receives a fixed direct voltage $V_i$. The direct voltage supply means comprises a switching element SW, here in the form of a controlled semiconductor diode, downstream of which is connected a filter element comprising a choke L, a capacitor C and a free-running diode $D_1$. Provided at the output is a voltage divider comprising resistors $R_1$ and $R_2$, from which voltage divider a voltage proportional to the output voltage $V_u$ can be tapped off.

This voltage is on the one hand passed to the control pulse generator 8. The latter produces a pulse frequency which is proportional to the voltage and with which the controlled rectifiers of the inverter 1 can be ignited and quenched. This frequency $f_{inv}$ corresponds to the operating frequency of the consumer unit connected downstream, i.e. 50 c/s for example. In the case of an inverter in which all the controlled rectifiers are jointly quenched, the quenching pulse must have a six-times greater frequency. This frequency is generally first produced and the ignition pulses are derived therefrom.

The voltage tapped off at the resistor $R_1$ is also passed to a comparator circuit 9 which comprises a setting device to which a reference voltage 10 is passed. A fault signal is obtained which is amplified in the comparator circuit 9 and inverted. The signal $\theta_i$ obtained in this way is passed through a frequency-correcting network 11 to a step regulator 12, the output voltage $\theta_o$ of which is a rectangular wave train. This is passed to a pulse amplifier 13 which provides from the flanks of the wave train the two control pulses $s_1$ and $s_2$ for respectively igniting and quenching the switching element SW.

The switching element operation is illustrated in FIG. 2. The output signal $\theta_o$ has an on time $T_e$ and an off time $T_a$. The entire period is therefore T. After inversion, the output signal $\theta_o$ corresponds to the output signal at the switching element SW. The ratio of the on time $T_e$ to the period T is the same as the ratio of the output voltage $V_u$ to the input voltage $V_i$. The period T is the reciprocal of the switching frequency $f_{sw}$. The relationship can therefore also be expressed thus.

$$V_u/V_i = T_e \cdot f_{sw}$$

In FIG. 3 frequency $f$ is plotted against the value $V_u/V_i$. The line A corresponds to the frequency of the quenching pulse produced in the frequency generator 8 and equal to six times the frequency $f_{inv}$ of the inverter. When the system is operating on 50 cycles, this frequency reaches a value of 300 c/s. The line B corresponds to a known case in which the switching frequency $f_{sw}$ of the ignition signal $s_1$ of the switching element SW is constant and has a value of 1,000 c/s. Then, each second ignition pulse $s_1$ provides a 500 cycle line which is designated by the letter C. Also, the line D corresponds to each third ignition pulse $s_1$ and line E to each fourth ignition pulse. The lines A and E intersect at 250 c/s. Since quite considerable currents and fields are set up at the switching frequency or at a fraction thereof, it is not possible to prevent the pulse generator 8 from being affected. This is particularly so even when it is electrically connected to the direct voltage supply means. These fields, currents or voltages interfere with the normal production of frequency. If for example, a capacitor, which is discharged through a unijunction transistor when a predetermined limiting value is reached, is charged in the pulse generator 8 by the voltage at the resistor $R_1$, the 1,000 cycle drop in the voltage between the first and second bases of the unijunction transistor leads to interference with the frequency produced. Thus, for a given interference, the frequency in the pulse generator 8 can fluctuate over a considerable range. This range is shown by hatching in FIG. 3 and is bounded along the x-axis by the values $v_1$ and $v_2$. This range is quite large. Within the stated range the frequency of the inverter cannot be stabilized.

In contrast to this, the frequency curves shown in FIG. 4 are obtained when a time proportional regulator is used. The line A' for the frequency produced in the pulse generator 8 remains unaltered. The frequency curve B' however, follows a path in which, when the ratio $V_u/V_i$ increases, the frequency $f_{sw}$ first rises and, after reaching a maximum value, returns to zero. The curves C', D' and E' for each second, third and fourth ignition pulse $s_1$ respectively follow proportional paths. In this arrangement although the line A' cuts across all the other curves B', C', D' and E', the range in which the switching frequency can interfere with the inverter frequency is very narrow at each point of intersection. The widest range, which occurs at the point of intersection with the curve E', is drawn to a greater scale. Here, the limiting values $v_1$ and $v_2$ are obtained which lie considerably closer together than in the case of FIG. 3. The other curves B', C' and D' meet the line A' at a steeper angle so that the interference range is still narrower at these places. There thus results more, but considerably narrower ranges in which interference may occur. The frequency of the inverter can therefore be adjusted much more accurately than heretofore.

As will be explained in more detail hereinafter in connexion with FIG. 7, the crests of the curves can be displaced by the use of non-linear elements. Curve B'' follows such a path. Consequently, a still steeper angle and a corresponding reduction in the widening of the ranges suffering interference can be achieved in the vicinity of the point of intersection with the line A'.

A form of step regulator 12 that may be used in accordance with the invention and having a frequency-correcting network 11 connected upstream is illustrated in FIG. 5. The network 11 consists of a RC element with a line resistor R3 and a shunt capacitor $C_2$. The input signal $\theta_i$ is applied to the input terminals 14 and 15 of the network 11. The output of the network is connected to the input terminals 16 and 17 of the regulator 12. The output signal $\theta_o$ is tapped off at the output terminals 18 and 19.

The regulator has two supply leads 20 and 21 to which the negative voltage $-A$ and the positive voltage $+A$ respectively are applied. Zero potential is applied to a lead 22 connecting the terminals 16 and 18. The regulator 12 comprises a sum-and-difference amplifier incorporating the two transistors $T_1$ and $T_2$. These have a common emitter resistor $R_4$. The transistor $T_2$ has a collector resistor $R_5$. Connected to a point 23 between the collector resistor $R_5$ and the transistor $T_2$ is the base of an output transistor $T_3$ which is complementary to the sum-and-difference transistors $T_1$ and $T_2$. The output transistor $T_3$ has a collector resistor $R_8$. The output terminal 19 is connected to a point 24 between the collector resistor $R_8$ and the output transistor $T_3$. A diode $D_2$ connects the two output terminals 18 and 19 and ensures that the output signal $\theta_o$ is always negative or less than zero. The output terminal 19 is connected to the input terminal 14 by way of a voltage divider which comprises the resistors $R_9$, $R_{10}$ and $R_{11}$. The base of the transistor $T_1$ is connected to the tap 25 of the voltage divider. The resistors $R_9$ and $R_{10}$ together with a shunt capacitor $C_3$ constitute a negative time-delay feedback. The voltage $V_{B1}$ is applied to the base of the transistor $T_1$. The output terminal 19 is connected to the other input terminal 17 by way of a voltage divider incorporating resistors $R_{12}$ and $R_{13}$. The base of the transistor $T_2$ is connected to the tap 26. The voltage $V_{B2}$ is applied to this base. The resistor $R_{12}$ forms a positive feedback.

Within the operating range of $\theta_i$, the feedback through the resistors $R_9$ and $R_{10}$ should be capable of compensating the feedback through $R_8$. The following voltage-divider relationships are defined:

$$R_{12}/(R_3 + R_{13} + R_{12}) = K_1$$
$$(R_3 + R_{13})/(R_3 + R_{13} + R_{12}) = (1 - K_1)$$
$$R_{11}/(R_9 + R_{10} + R_{11}) = K_2$$

It is here assumed that the rating of the emitter resistor $R_4$ is high so that the transistors $T_1$ and $T_2$ do not load the connected voltage dividers. The effect of the capacitor $C_2$ is initially ignored. The sum-and-difference amplifier is always switched when $V_{B1}$ is less or greater than $V_{B2}$. Here, because of the feedback through the resistor $R_{12}$, $V_{B2}$ undergoes fluctuation of the following magnitude:

$$\Delta = -A(1 - K_1).$$

The mode of operation of this regulator can be seen from FIG. 6 where the values $V_{B1}$ and $V_{B2}$ are plotted on the x-axis, and the first derivation of $V_{B1}$, standardized by the time constant $T_r$ of the negative feedback, is plotted on the y-axis, so that $T_r \overset{\circ}{V}_{B1}$ is plotted. Two lines F and G are plotted at this phase level to illustrate $V_{B1}$. The line F shows the condition in the case of a conductive output transistor $T_3$ when $\theta_o$ is therefore equal to $-A$, whereas line G illustrates the case where the output transistor $T_3$ is not conductive, i.e. when $\theta_o$ = zero. If the development for the first-mentioned case is considered, the following equations are obtained:

$$V_{B1} = -AK_2[1 - e^{(-t/T_r)}]$$
$$T\overset{\circ}{V}_{B1} = -AK_2 e^{-t/T_r}$$
$$V_{B1} = -AK_2 - T_r \overset{\circ}{V}_{B1}$$
$$\overset{\circ}{V}_{B1} = (-AK_2 - V_{B1})/T_r$$

This shows that the line F must follow a path at an angle of 45° to the x-axis and must intersect this at the point $-A \cdot K_2$. The value for $V_{B2}$ is determined by $\theta_i \cdot K_1$ and the difference $\Delta$.

If for a predetermined value of $\Delta$, the output transistor $T_3$ has switched to the conductive condition, the working point moves from $a$ on the line F to the point $b$. This takes place with a certain delay, whereas switching on and off takes place immediately when the difference $\Delta$, governed by the feedback, ceases. As soon as $V_{B1}$ has reached the point $b$, the output transistor $T_3$ switches to the non-conductive condition, the operating point $c$ being brought in. This then moves along the line G to the point $d$ where the transistor $T_3$ is again switched to the conductive condition. When this change in $\theta_i$ occurs, the hysteresis rectangle shifts between the lines F and G along the x-axis. This causes the ordinate to change. The greater the ordinate, the more rapidly are the curves F and G traversed. Since the dwell on the curve F corresponds to the on time and the dwell on the curve G to the off time, correspondingly differing on time/off time ratios result. Interestingly enough, the use of a step regulator of this kind not only leads to the above-mentioned change in on time with respect to off time, but also to such change in frequency in the case of the output signal $\theta_o$ that a stepped change in the output voltage $V_u$ is obtained in dependence upon the input signal $\theta_i$.

If the rating of the resistor $R_3$ is very much lower than that of the resistor $R_{13}$, the capacitor $C_2$ has no appreciable effect upon the signal returned through the resistor $R_{12}$. On the other hand, a time constant $R_3 \cdot C_2$ is obtained which acts upon the input signal $\theta_i$. This is of importance since the regulator 12 has a PD action. A sudden change in $\theta_i$ would then be accompanied by very long on times or very long off times and this would place heavy demands upon the filter coil L. Furthermore, undesirable transient oscillations could occur. Due to the time delay in the network 11, the on time/off time ratio gradually changes to another ratio when $\theta_i$ changes. Favourable values for $R_3 \cdot C_2$ result when:

$$\tfrac{1}{3} T_r < R_3 C_2 < T_r.$$

The diode $D_2$ serves to establish the operating range of $\theta_i$ at values below zero. In this way, the operating range is specifically limited.

In place of the negative feedback of FIG. 5, a circuit in accordance with FIG. 7 can be used. Here, the resistor $R_9$ is bridged by a resistor $R_{14}$ and a diode $D_3$ connected in series. Consequently, only the resistor $R_9$ is operative in one voltage direction, whereas the parallel-connected resistors $R_9$ and $R_{14}$ are effective in the other direction. The crest of the frequency curve of FIG. 4 is thus displaced so that the curve B'' is obtained.

I claim:

1. A regulated voltage supply system comprising an inverter including controlled rectifiers; a regulated direct voltage supply means having an input to which in use a fixed direct voltage is applied and an output connected to said inverter, said supply means comprising an on/off switchable element connected to said input of the supply means, a filter connected between said switchable element and said output of the supply means, and a control circuit connected to said output of the supply means and to said switchable element for supplying first control pulses to said switchable element; and a pulse generator connected to said output of the supply means for deriving second control pulses to control said rectifiers in the inverter; wherein said control circuit comprises a step regulator formed by a high-gain amplifier having negative and positive feedback paths, the negative feedback path effecting a time-delay and comprising a first resistor and a nonlinear network formed by a first diode and a second resistor connected in series across said first resistor and the positive feedback path resulting in the production of an oscillation which controls both the frequency and the width of the first control pulses when the voltage at said output of the supply means changes.

2. A system according to claim 1 wherein said amplifier is a sum-and-difference amplifier having two inputs and an output, the output of said amplifier being connected via said negative feedback path to one of said inputs of said amplifier, and via said positive feedback path to the other of said inputs of said amplifier.

3. A system according to claim 2 wherein said amplifier has first and second input terminals and first and second output terminals, and comprises first and second junction transistors, a resistor connected to the collector of the second transistor, a third transistor which is controlled by the voltage-drop across said collector resistor, a neutral lead, and two supply leads which carry a higher and lower potential respectively than said neutral lead which connects said first input terminal of said amplifier to said first output terminal of said amplifier, said second output terminal of said amplifier and said two feedback paths being connected to the collector of said third transistor.

4. A system according to claim 3 wherein said step regulator further comprises first and second voltage dividers having respective tapping points, and said second output terminal of said amplifier is connected by way of said first voltage divider to said first input terminal of said amplifier, and by way of said second voltage divider to said second input terminal of said amplifier, the bases of said first and second transistors being respectively connected to said tapping points of the voltage dividers.

5. A system according to claim 1 wherein said negative feedback path comprises a first RC-network formed by said first resistor and a capacitor.

6. A system according to claim 5 wherein said step regulator further comprises a second RC-network of the same order of magnitude as said first RC-network connected between said output of the supply means and said amplifier.

7. A system according to claim 1 wherein a diode is connected between said step regulator and said switchable element to limit the voltage supplied to the switchable element to negative values.

8. A regulated voltage supply system comprising an inverter including controlled rectifiers; a regulated direct voltage supply means having an input to which in use a fixed direct voltage is applied and an output connected to said inverter, said supply means comprising an on/off switchable element connected to said input of the supply means, a filter connected between said switchable element and said output of the supply means, and a control circuit connected to said output of the supply means and to said switchable element for supplying first control pulses to said switchable element; and a pulse generator connected to said output of the supply means for deriving second control pulses to control said rectifiers in the inverter; wherein said control circuit comprises a step regulator formed by a high-gain amplifier having negative and positive feedback paths, the negative feedback path effecting a time-delay and comprising a first resistor and a nonlinear network formed by a first diode and a second resistor connected in series across said first resistor, and the positive feedback path resulting in the production of an oscillation which controls both the frequency and the width of the first control pulses when the voltage at said output of the supply means changes, the effect of said positive feedback path having a lesser effect than said negative feedback path, said amplifier being a sum-and-difference amplifier having two inputs and an output, the output of said amplifier being connected via said negative feedback path to one of said inputs of said amplifier, and via said positive feedback path to the other of said inputs of said amplifier.

* * * * *